United States Patent Office 3,001,969
Patented Sept. 26, 1961

3,001,969
HEAT-STABILIZATION OF POLYETHYLENE AND POLY-MONO-α-OLEFINS USING CERTAIN ZINC DIALKYLDITHIOCARBAMATES
Clarence E. Tholstrup and John W. Tamblyn, Kingsport, Tenn., assignors to Eastman Kodak Company, Rochester, N.Y., a corporation of New Jersey
No Drawing. Filed July 8, 1957, Ser. No. 670,375
1 Claim. (Cl. 260—45.75)

The art has long recognized the problem of stabilizing against heat degradation such thermoplastic hydrocarbons as polyethylene, paraffin wax, polypropylene, mixtures thereof and more recently developed polymers of 3-methyl-butene-1, 3,3-dimethyl-butene-1, pentene-1, 4-methyl-pentene-1, 4,4-dimethyl-pentene-1, and other polymerizable α-mono-olefins.

This invention most particularly relates to providing heat stability for high polymers of mono-α-olefins containing 3 to 8 carbon atoms such as those which normally have an oven life value under 1 hour at 160° C. These oven life values are measured by the active oxygen method as described hereinbelow.

These high polymers have presented considerable difficulty in applications where heat degradation is likely such as in extrusion, melt spinning, use of finished products as components of apparatus operated at high temperatures, etc.

Operations at high temperatures are limited by the necessity for shutting down the processing equipment for cleaning out the degraded products which accrue over a period of time at the high temperature employed. Obviously, it is not practical to operate at a temperature which requires frequent shut-downs. Similar considerations are involved in other forming operations involving high temperatures.

Similar considerations, but on an even more critical level, apply to the high polymers of mono-α-olefinic hydrocarbons containing from 3 to 8 carbon atoms. This is due to the apparently inherently greater instability of the latter class of polymers at high temperatures. Thus, the invention has great unobviousness and contributes a most remarkable improvement to the heat stability characteristics of this quite distinct class of polymers. It is clear that high polymers of ethylene and high polymers of mono-α-olefins containing 3–8 carbon atoms are not mere equivalents.

It is well known that the deterioration of synthetic resins at high temperatures may be retarded by the addition of various antioxidants, such as phenolic compounds or aromatic amines. Many of these antioxidants perform quite satisfactorily at temperatures as high as 140° C. but show a rapid decrease of effectiveness as the temperature is raised above this level. This is a serious shortcoming in the effectiveness of such antioxidants since the modern trend in processing is toward the use of higher temperatures in injection molding, fiber formation, paper coating, etc.

Table A presents data regarding the relative efficacy in stabilizing polyethylene of zinc dialkyldithiocarbamates contrasted to various compounds not covered by this invention; the data in Table A is hereinbelow compared to other data in Table B showing test results when stabilizing polypropylene.

TABLE A

Potency of compounds for stabilizing two samples of polyethylene at high temperatures

| Compound | Oven Storage Life in Hours at Designated Temperature and Concentration of Compound (wt. percent) | | | |
|---|---|---|---|---|
| | 140° C. | | 160° C. | |
| | 0.02% | 0.1% | 0.02% | 0.1% |
| None (control sample A) | (5) | (5) | (2) | (2) |
| (a) 2-Mercaptobenzothiazole | 5 | 12 | | |
| (b) Tetramethylthiuramidisulfide | 14 | 24 | | |
| (c) N,N'-Diphenyl-p-phenylenediamine | | 100 | | 24 |
| (d) 2,2'-Methylene bis (6-tert butyl-p-cresol) | | 130 | | 18 |
| (e) Zinc dimethyldithiocarbamate | 32 | 40 | 5 | 13 |
| (f) Zinc dibutyldithiocarbamate | >163 | >163 | 13 | 105 |
| None (control sample B) | | | | (3) |
| (g) Zinc diisopropyldithiocarbamate | | | | >83 |
| (f) Zinc dibutyldithiocarbamate | | | | >147 |

This table shows how quickly the potency of many compounds as heat stabilizers decreases at temperatures above 140° C., for example, see data for compounds (c) and (d) above. Since compound (e) is not in the same class with compounds (f) and (g), it is not included within the scope of this invention; the invention is limited to compounds where the alkyl radicals are lower alkyl radicals containing at least 2 carbon atoms, e.g. isopropyl, butyl, isobutyl, amyl, etc.

Heat stabilizers in general are normally used at concentrations of not much more than 0.1–0.5% whereas it is usually necessary to use compounds intended as plasticizers, pigments and light stabilizers at concentrations which are much greater than those normally employed for heat stabilizers.

Polyethylene is frequently subjected to processing temperatures considerably above 150° C. especially in extrusion operations such as paper coating where temperatures may reach 300° C. or even more. However, a temperature of 160° C. is employed in the tests described in this specification as a convenient temperature for test purposes since it permits the evaluation of a wide variety of antioxidants under conditions where those of intermediate value still have some degree of efficacy even though it may be quite small. At much higher temperatures approaching 200° C. or higher, it is apparent that zinc di-lower alkyldithiocarbamates covered by this invention are quite effective heat stabilizers at reasonable concentrations.

These same considerations similarly apply to heat stabilization of high polymers of mono-α-olefins containing 3–8 carbon atoms; however, due to their inherently greater instability to heat, it is generally desirable to use the heat stabilizers of this invention in concentrations of at least 0.1% and preferably 0.5% to 3%, or sometimes more.

Various objects of this invention have already been made apparent. It is a further object of this invention to provide polypropylene in solid form as waxes, hard, tough solids, or high-density products such as films, fibers, molded products, extruded products or the like which can be subjected to high temperatures for extended periods of time without substantial heat degradation or discoloration.

It is another object of this invention to provide a process for forming shaped objects from polypropylene such as films, fibers, tubing, injection molded products, etc. in a satisfactory manner at an increased rate as a result of the heat stability of the polymeric thermoplastic at a much higher temperature than heretofore.

It is a further object of this invention to provide a heat stabilizer for polypropylene consisting of the zinc salts of di-lower alkyl dithiocarbamic acids wherein the alkyl radicals contain at least 2 carbon atoms, especially zinc dibutyldithiocarbamate.

Still further objects are apparent elsewhere in this specification.

According to a principal embodiment of this invention there is provided a thermoplastic heat-stable composition consisting primarily of a normally solid polypropylene, plus a stabilizing amount of a zinc di-lower alkyldithiocarbamate wherein the alkyl radicals contain at least 2 carbon atoms, especially zinc dibutyldithiocarbamate, said thermoplastic heat-stable composition being characterized by processability at temperatures within the range of 150° to 300° C. without substantial discoloration or degradation, and by the retention of substantially uniform electrical characteristics when exposed to elevated temperatures such as 40°-100° C. for prolonged periods of time.

The amount of said heat stabilizer advantageously used varies as explained above depending upon what polymer is being stabilized and the degree of stability desired. It is considered that 3% would probably be the maximum required under the most severe conditions now envisioned.

The thermoplastic normally solid polymeric compositions which can be stabilized in accordance with this invention include highly polymeric polypropylene which can have various molecular weights whereby the thermoplastic materials are compositions ranging from soft waxy materials to high density hard solids and crystallizable polymers which can be spun to form useful textile fibers or oriented film.

The close relationship between zinc and cadmium apparent from the periodic table indicates that the cadmium salts which correspond to the zinc salts of this invention would function somewhat analogously, and it may be that they do; however, even here there is no known basis for predictability of results since investigations in the art in general reveal a wide variation in effects between various metal salts without any apparent basis for prognostication. Thus stabilizers for natural rubber, synthetic rubber and related elastomeric materials, hydrocarbon lubricating oils, hydrocarbon greases, etc., even though they are hydrocarbon materials, do not show the same heat-stability effects and characteristics as do the thermoplastic normally solid compositions of this invention. The same is even more obvious in regard to those compounds and polymers described in the art which include other chemical elements besides carbon and hydrogen, e.g. polyvinyl chloride, chlorinated polyethylene, etc.

In view of the specificity of the heat stabilizing results achieved, this invention is not intended to encompass lubricants, greases, lubricating oils, or any other complex compositions. Of course, this invention does not exclude the presence of small quantities of other additives which may be useful, e.g. carbon black, colored dyes and pigments, etc.

This invention provides in a process for shaping highly polymeric thermoplastic polypropylene at a high temperature, the improvement consisting of performing the shaping operation upon said thermoplastic polymer in a molten condition, said thermoplastic polymer containing an additive material comprising from 0.1% to about 3% by weight of a zinc di-lower alkyldithiocarbamate wherein the alkyl radicals contain at least 2 carbon atoms.

The shaping operations include extruding sheets, film, fibers, tubing, etc., compression molding, injection molding, etc. Moreover similar improvements are provided in coating paper and related unwoven and woven materials with waxy compositions encompassed herein applying such compositions at 150° C. or higher. Since such temperatures are advantageously maintained for relatively long periods of time, the heat stabilizers of this invention provide a quite important improvement. Coated paper which can be produced has improved electrical stability under adverse conditions of use in electrical condensers, etc. Electronic and electrical equipment will perform more satisfactorily for long periods of time at elevated temperatures when the features of this invention enter into the manufacture of the appropriate components.

In addition to the excellent degree of heat stability provided by this invention, it is quite significant that the zinc di-lower alkyldithiocarbamates do not produce discoloration in the stabilized thermoplastic hydrocarbons. Other salts, such as the nickel salt, suffer serious disadvantage from the discoloration standpoint which militates against their use in producing the colorless products which are often much desired.

Table B presents data regarding the efficacy of various zinc dialkyldithiocarbamates in heat stabilizing highly polymeric solid thermoplastic synthetic resins derived from 1-propene (polypropylene) and from 4-methylpentene-1.

TABLE B

*Potency of compounds for stabilizing polymers of mono-α-olefins at high temperatures*

| Polymer Substrate and Heat-Stabilizer Compound Additive | Oven Storage Life in Hrs. at designated Temperature and Concentration of Component (wt. %) | | | | | |
|---|---|---|---|---|---|---|
| | Powdered polymer at 140° C. | | | Polymer at 160° C. | | |
| | 0.1% | 0.5% | 1.0% | 0.1% | 0.5% | 1.0% |
| Polypropylene substrate: | | | | | | |
| No additive— | | | | | | |
| (a) powder | 0.5(a) | 0.5(a) | 0.5(a) | 0.2(a) | 0.2(a) | 0.2(a) |
| (b) molded | (b) | (b) | (b) | 0.2(b) | 0.2(b) | 0.2(b) |
| (a) Zinc diisopropyldithiocarbamate | | | 9(a) | 25(a) | | |
| (b) Zinc dibutyldithiocarbamate | 1.5(a) | 5(a) | 75(a) | (a) | 12(a) | >60(a) |
| | | | | >40(b) | >61(b) | >103(b) |
| (c) Zinc diisobutyldithiocarbamate | | 17(a) | >25(a) | | | |
| (d) Zinc diisoamyldithiocarbamate | | 8(a) | 11(a) | | | |
| (e) 2,6-ditert.butyl-4-methylphenol | | 1(a) | 5(a) | (a) | 3(a) | 5(a) |
| | | | | 1(b) | 4(b) | 6(b) |
| Poly-4-methylpentene-a substrate: | | | | | | |
| No additive | | | | <1 | | |
| (b) Zinc dibutyldithiocarbamate | | | | >65 | | |
| (f) Zinc diamyldithiocarbamate | | | | >65 | | |

This Table B illustrates the greater inherent susceptibility of polypropylene to degradation due to heat compared to polyethylene (see Table A above). However, the designated zinc di-lower alkyldithiocarbamates are shown to possess outstanding potency in stabilizing these polymers as shown in Table B. Their relative potency compared to known antioxidants is illustrated by the data provided in item (e) of this table for the compound which is commonly called BHT (butylated hydroxytoluene) or sometimes also called butylated para-cresol; this compound is commercially sold by several companies as an antioxidant for various materials normally subject to oxidative deterioration including polyethylene.

This invention has been illustrated by the examples in the above tables showing preferred embodiments although it will be understood that these examples are included merely for purposes of illustration and are not intended to limit the scope of the invention unless otherwise specifically indicated. The data in these tables was obtained in a manner which can be illustrated as follows:

A sample was roll-compounded for 6 minutes with the percentage of the anti-oxidant heat stabilizer to be tested. The roll temperatures were: front roll 245° F. (118° C.), rear roll 210° F. (99° C.).

Specimens of these compoundings were exposed in an air oven at temperatures of 140° C. and 160° C., and the peroxide content measured from time to time. Details of this measurement are as follows:

Six 0.25-gram specimens of the compounding were placed in a forced air oven, heated to either 140° C. or 160° C. throughout the test. At intervals one of these specimens was removed and its peroxide content determined as follows: The 0.25-gram specimen was finely chopped and placed in a 250-ml. Erlenmeyer flask containing 20 ml. carbon tetrachloride. The flask with its contents was then heated on a steam bath just below the boiling point for 25 minutes with frequent swirling. To this hot solution was added 20 ml. of a 60% glacial acetic acid/40% chloroform mixture. One ml. of a saturated aqueous potassium iodide was added, and the flask was then stoppered and agitated for 2 minutes in subdued light. Distilled water (100 ml.) was then added, and the iodine titrated with 0.002 N sodium thiosulfate, using 2 ml. of starch indicator solution (1%). It is necessary to vigorously shake the flask toward the end point. The peroxide content was then reported as the milliequivalents of peroxide per kilogram of specimen.

The heating time required to initiate the formation of peroxides was recorded as the oven storage life in Tables A and B.

We claim:

In a process for shaping a thermoplastic, normally solid, highly polymeric material normally subject to oxidative deterioration at temperatures above 150° C. which is essentially composed of polypropylene, the improvement which consists in performing said shaping upon said highly polymeric material while in a stable molten condition containing from about 0.1% to about 3% by weight of zinc dibutyldithiocarbamate, said shaping being performed while said molten condition is maintained at least until said polymeric material would normally suffer deleterious oxidative deterioration.

References Cited in the file of this patent
UNITED STATES PATENTS

| | | |
|---|---|---|
| 2,387,518 | Lightbown et al. | Oct. 23, 1945 |
| 2,582,510 | Stiratelli | Jan. 15, 1952 |

FOREIGN PATENTS

| | | |
|---|---|---|
| 154,315 | Australia | Apr. 17, 1952 |

OTHER REFERENCES

Raff: Polyethylene High Polymers, vol. XI, Interscience Pub., New York, page 418.